United States Patent [19]

Kondo et al.

[11] Patent Number: 5,062,068
[45] Date of Patent: Oct. 29, 1991

[54] COMPUTERIZED ANALYZING SYSTEM FOR PIPING NETWORK

[75] Inventors: Shinya Kondo; Shinichi Kondo, both of Fuchu, Japan

[73] Assignee: Kabushiki Kaisha Toshiba, Kawasaki, Japan

[21] Appl. No.: 476,727

[22] Filed: Feb. 8, 1990

[30] Foreign Application Priority Data

Feb. 9, 1989 [JP] Japan ................................ 1-30324

[51] Int. Cl.⁵ ............................................. G06F 15/56
[52] U.S. Cl. .................................... 364/578; 364/510; 364/900
[58] Field of Search ................ 364/550, 551.01, 578, 364/505, 506, 509, 510, 521, 715.02, 803, 200, 900, 512

[56] References Cited

U.S. PATENT DOCUMENTS

| | | | |
|---|---|---|---|
| 3,551,694 | 12/1970 | Boxall | 364/803 |
| 3,581,077 | 5/1971 | Damewood et al. | 364/851 |
| 3,599,233 | 8/1971 | Meyer | 364/803 |
| 3,927,948 | 12/1975 | Cox et al. | 364/512 |
| 4,200,911 | 4/1980 | Matsumoto | 364/510 |
| 4,353,117 | 10/1982 | Spellman | 364/512 |
| 4,404,646 | 9/1983 | Edlund et al. | 364/578 |
| 4,553,206 | 11/1985 | Smutek et al. | 364/715.02 |
| 4,831,546 | 5/1989 | Mitsuta et al. | 364/550 |

OTHER PUBLICATIONS

Proceedings of the 1987 American Control Conference, vol. 2, Jun. 10, 1987, Minneapolis MN, U.S.A., pp. 1353–1358; G. Karsai et al., "Intelligent Supervisory Controller for Gas Distribution System".
Elektrotechnische Zeitschrift-ETZ. vol. 100, No. 2, Jan. 1979, Berlin DE, pp. 70–74; H. Belkhofer et al., "DV-Systeme fur die Netzplanung".

*Primary Examiner*—Parshotam S. Lall
*Assistant Examiner*—Michael Zanelli
*Attorney, Agent, or Firm*—Oblon, Spivak, McClelland, Maier & Neustadt

[57] ABSTRACT

A computerized analyzing system for a piping network, in which an actual piping network chart input to a map information input unit is compressed to an equivalent piping network model by a compressor, the compressed piping network model is analyzed by a piping network analyzer, and results of analyzation are displayed on a display unit, includes an initial image data memory for storing initial image data of the piping network chart input to the map information input unit, a compression sequence memory for storing a compression sequence of the input piping network chart to the piping network model, an analyzation result expander for executing the compression sequence stored in the compression sequence memory in an opposite manner to expand the results of analyzation of flow rates and pressures of pipelines and/or nodes in the piping network model obtained by the piping network analyzer to corresponding results of analyzation of the flow rates and the pressures of pipelines and nodes in the piping network chart, and a display output controller for causing the display unit to display the result of analyzation obtained by the analyzation result expander together with the piping network chart stored in the initial image data memory.

12 Claims, 11 Drawing Sheets

COMPUTERIZED ANALYZING SYSTEM FOR PIPING NETWORK

BACKGROUND OF THE INVENTION

1. Field of the Invention

The present invention relates to a computerized analyzing system for a piping network, which analyzes a relationship between flow rates and head differences, etc. at pipelines and nodes in a piping network chart and, more particularly, to a computerized analyzing system for a piping network, which improves a display method of a result of analyzation.

2. Description of the Related Art

Figure 5A:
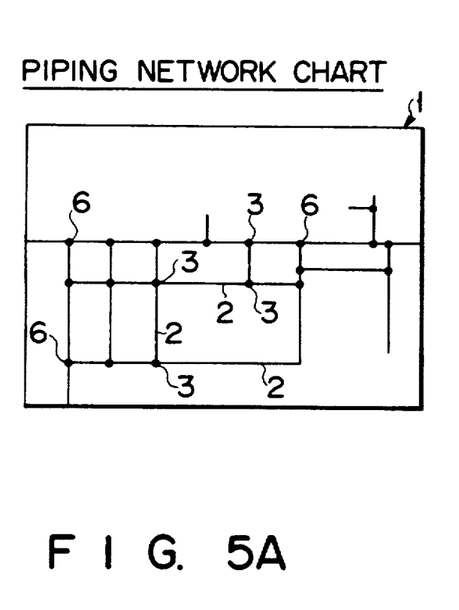
FIGS. 5A and 5B illustrate a piping network chart (FIG. 5A) and a piping network model (FIG. 5B) which are used for explaining a problem of a conventional piping network analyzation system.

In a computerized analyzing system for a piping network for analyzing the relationship between water flow rate q in each pipeline 2 and head difference h between nodes 3 in actual piping network chart 1 shown in FIG. 5A, if analyzation processing is executed using actual piping network chart 1, much labor and time are required.

In order to solve this problem of much labor and time, the following method can be employed. More specifically, piping network chart 1 drawn on a paper sheet is read by an image scanner, and read actual piping network chart 1 is stored in an initial image data memory as initial image data. When the piping network analyzation described above is executed, conversion processing called "compression" is executed. In this processing, minor pipelines 2 and nodes 3 are deleted from piping network chart 1 stored in the initial image data memory, thereby converting chart 1 into equivalent piping network model 4 shown in FIG. 5B.

Figure 5B:
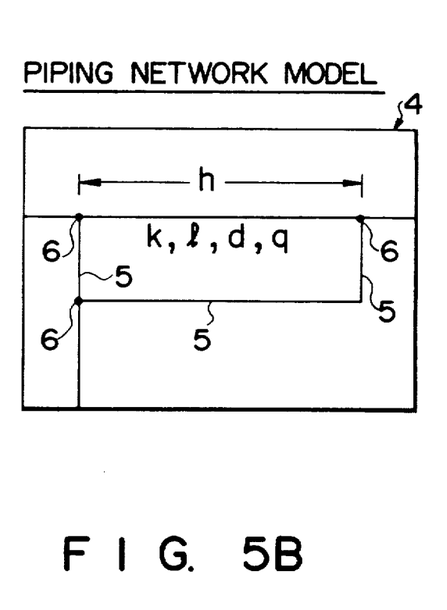

More specifically, the above-mentioned result of analyzation among three pipelines input/output to/from piping network chart 1 (FIG. 5A) is equal to that among three pipelines 5 input/output to/from piping network model 4 (FIG. 5B). Therefore, piping network chart 1 can be equivalently substituted with piping network model 4.

The relationship between flow rate q in each pipeline 5 and head difference h between nodes 6 of piping network model 4 can be analyzed using pipeline diameter d, pipeline length l, resistance coefficient k of a pipeline, and the like. Since the number of pipelines and the number of nodes of piping network model 4 are considerably decreased as compared to those of actual piping network chart 1, programming labor necessary for piping network analyzation of piping network model 4 and its execution time can be greatly reduced. The obtained results of analyzation q and h, and data k, l, and d are displayed on a CRT display together with piping network model 4.

However, when the results of analyzation are merely displayed on the CRT display in a state shown in FIG. 5B, pipelines 5 of displayed piping network model 4 do not directly correspond to pipelines 2 in actual piping network chart 1. Therefore, it is very difficult to understand the correspondence between the results of analyzation (q and h) and actual pipelines 2.

If an actual map pattern can be simultaneously displayed together with piping network model 4, such a drawback can substantially be eliminated.

In this manner, when the actual map is simultaneously displayed, pipelines 5 and nodes 6 of the piping network model can almost correspond to actual positions on the map. However, it is difficult for an operator of a system to immediately know the results of analyzation at pipelines 2 and nodes 3 in actual piping network chart 1 as a final object of piping network analyzation.

SUMMARY OF THE INVENTION

It is an object of the present invention to provide a computerized analyzing system for a piping network, which can display results of analyzation at pipelines and nodes of an actual piping network chart in a manner to allow easy recognition while executing high-speed analyzation using a piping network model.

In order to achieve the above object, results of analyzation calculated after a piping network chart is temporarily compressed to a piping network model are subjected to processing opposite to compression (expansion), thereby obtaining results of analyzation corresponding to the original piping network chart. Thus, a time required for analyzation can be greatly reduced as compared to direct analyzation of an actual piping network chart, and at the same time, results of analyzation of flow rates and pressures of pipelines and/or nodes can be displayed together with the actual piping network chart. Therefore, there can be provided a computerized analyzing system for a piping network, with which results of analyzation can be immediately recognized, and which is very easy to use.

More specifically, the present invention is applied to a computerized analyzing system for a piping network, in which an actual piping network chart input to a map information input unit is compressed to an equivalent piping network model by a compressor, the compressed piping network model is analyzed by a piping network analyzer, and results of analyzation are displayed on a display unit. This system comprises an initial image data memory for storing initial image data of a piping network chart input to the map information input unit, a compression sequence memory for storing a compression sequence of the input piping network chart to the piping network model, an analyzation result expander for executing the compression sequence stored in the compression sequence memory in an opposite manner to expand the results of analyzation of flow rates and pressures of pipelines and/or nodes in the piping network model obtained by the piping network analyzer to corresponding results of analyzation of the flow rates and the pressures of pipelines and nodes in the piping network chart, and an output controller for causing the display unit to display the result of analyzation obtained by the analyzation result expander together with the piping network chart stored in the initial image data memory.

According to the computerized analyzing system for the piping network with the above arrangement, an actual piping network chart input to the map information input unit is stored in the initial image data memory, and is compressed to a piping network model by the compressor. The compression sequence is stored in the compression sequence memory. The compressed piping network model is analyzed in accordance with a predetermined sequence by the piping network analyzer.

The analyzing results of pipelines and nodes of the analyzed piping network model are expanded (converted) to corresponding results of analyzation of pipelines and nodes of the actual piping network chart by executing the compression sequence stored in the compression sequence memory in an opposite manner. The expanded results of analyzation are displayed near the pipelines and nodes of the actual piping network chart read out from the initial image data memory and displayed on the display unit.

Additional objects and advantages of the invention will be set forth in the description which follows, and in part will be obvious from the description, or may be learned by practice of the invention. The objects and advantages of the invention may be realized and obtained by means of instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Preferred embodiments of the invention will be described with reference to the accompanying drawings. In the description, the same or similar elements are denoted by the same or similar reference numerals, in order to simplify the description.

An embodiment of the present invention will be described hereinafter with reference to the accompanying drawings.

Figure 1:
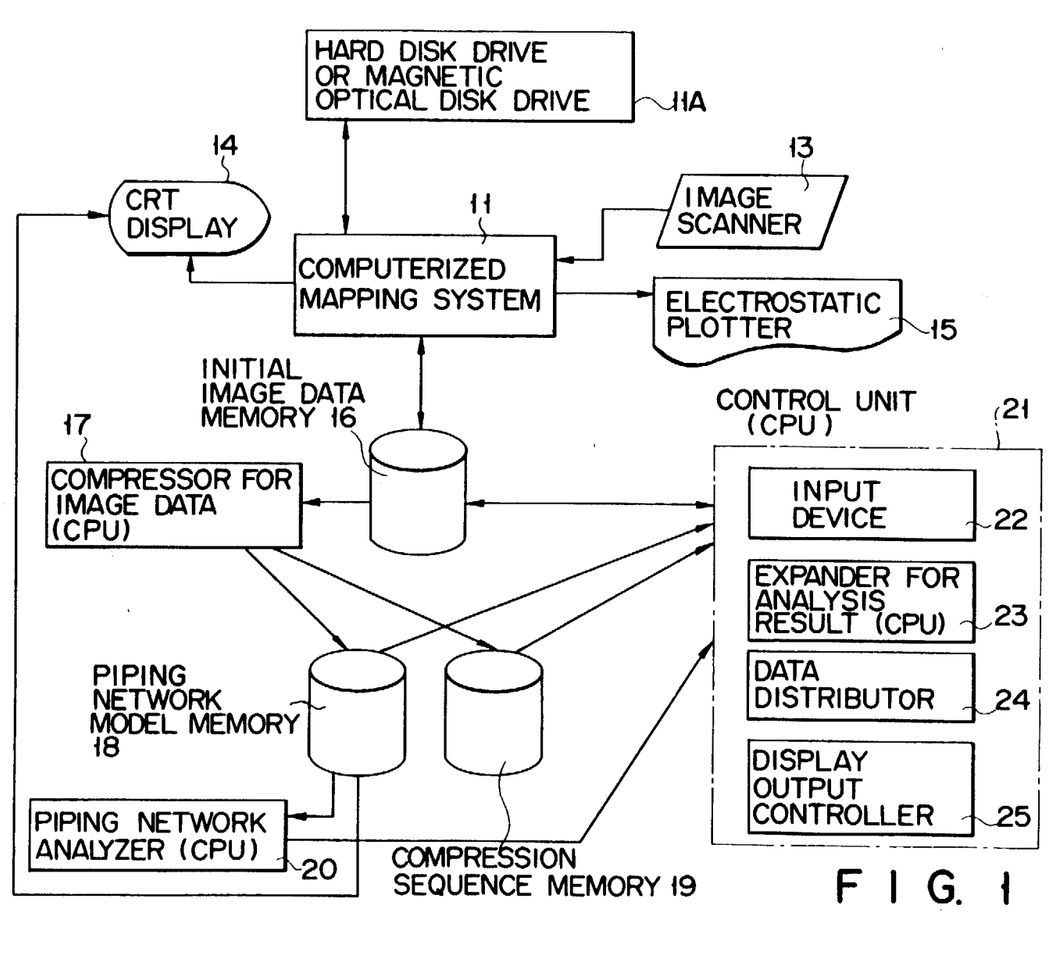
FIG. 1 shows a schematic configuration of a computerized analyzing system for a piping network according to an embodiment of the present invention.
Figure 4A:
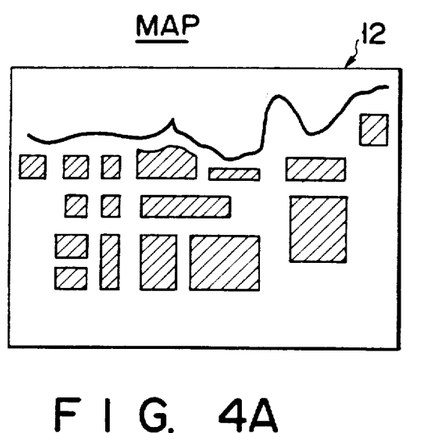
FIGS. 4A to 4D illustrate a map (FIG. 4A), a piping network chart (FIG. 4B), a piping network model (FIG. 4C), and an output image of the system of FIG. 1 (FIG. 4D) which is displayed on a CRT.

FIG. 1 is a block diagram showing a schematic configuration of a computerized analyzing system for a piping network according to the embodiment. Computerized mapping system 11 serving as a map information input unit and comprising a microcomputer is connected to image scanner 13 for reading image data of map 12 illustrating a topography, roads, urban areas, and the like as shown in FIG. 4A, piping network chart 1 shown in FIG. 4B, and the like, CRT display 14 for displaying image data and results of analyzation, electrostatic plotter 15 for printing data displayed on CRT display 14, and the like. (Note that computerized mapping system 11 itself can utilize a conventional one.)

Initial image data (bit map image) of piping network chart 1 input to computerized mapping system 11 through image scanner 13 is converted to vector data including coordinate data of nodes 3, and the vector data are stored in initial image data memory 16. Piping network chart 1 (vector data) stored in initial image data memory 16 is transferred to compressor 17 for image data.

Figure 4B:
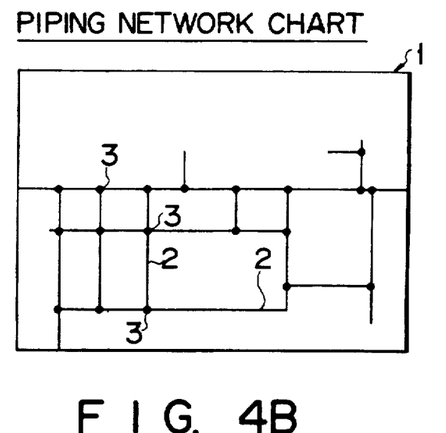
Figure 4C:
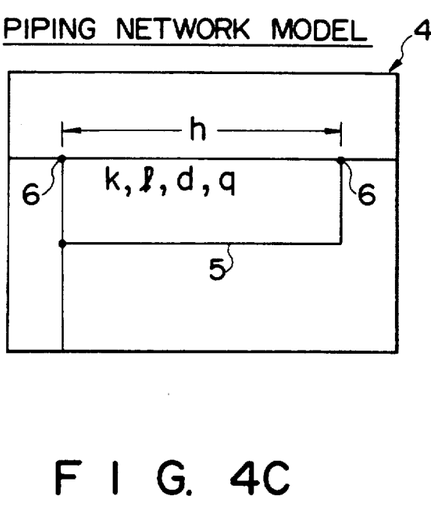

Compressor 17 deletes minor pipelines 2 and nodes 3 from input piping network chart 1, thus compressing vector data of piping network chart 1 to equivalent piping network model 4 shown in FIG. 4C.

Piping network model 4 (vector data) obtained by compressor 17 is stored in piping network model memory 18. A compression sequence of compressing input piping network chart 1 into piping network model 4 by compressor 17 and various data such as a pipeline diameter, a pipeline length, and the like of pipelines 2 and nodes 3 of piping network chart 1 used in the compression sequence are stored in compression sequence memory 19. (The compression sequence or compression processing will be described in detail later using equations (1) to (8).)

Piping network model 4 stored in piping network model memory 18 is transferred to piping network analyzer 20, and is analyzed according to a predetermined sequence of analyzation. More specifically, as shown in FIG. 4C, results of analyzation of flow rate q of each pipeline 5, head difference h (corresponding to a pressure at a node) between nodes 6, and the like can be obtained. The results of analyzation are sent to control unit 21 comprising a computer.

Input device 22 of control unit 21 receives the compression sequence and various data values of piping network chart 1 stored in compression sequence memory 19, piping network model 4 stored in piping network model memory 18, piping network chart 1 stored in initial image data memory 16, and the like in addition to results of analyzation of piping network model 4 sent from piping network analyzer 20.

Expander 23 for the results of analyzation executes the compression sequence in an opposite manner (i.e., executes expansion) using pipeline diameter d and pipeline length l of each pipeline 5 of piping network model 4 and pipeline diameter d and pipeline length of each pipeline 5 of piping network chart 1, thereby expanding results of analyzation of flow rate q of pipeline 5, head difference h between nodes, and the like of piping network model 4 input to input device 22 to those of flow rate q of pipeline 2, head difference h between nodes 3, and the like of original piping network chart 1. (Expansion processing will be described in detail later using equations (9) to (14).) The expanded results of analyzation are distributed to positions near corresponding pipelines 2 and nodes 3 of actual piping network chart 1 by data distributor 24.

Piping network chart 1 after the results of analyzation q and h are mapped near pipelines 2 and nodes 3 is stored in initial image data memory 16 through display output controller 25, and is then sent to CRT display 14 through computerized mapping system 11 to be displayed on it.

When image scanner 13 reads actual map 12 corresponding to piping network chart 1 shown in FIG. 4A bit map image data of map 12 is sent to CRT display 14 through computerized mapping system 11, and is superimposed and displayed on piping network chart 1 with the results of analyzation. In this manner, the display screen of CRT display 14 displays piping network chart 26 with map 12, and results of analyzation q and h. Piping network chart 26 can be appropriately printed by electrostatic plotter 15 and can be preserved.

Note that computerized mapping system 11 comprises hard disk drive or magnetic optical disk drive 11A having a large storage capacity. When map/piping network chart already stored in drive 11A is read out therefrom, scanner 13 need not be used.

Basic operations of a compression sequence in compressor 17 and an expansion sequence in expander 23 will be described below with reference to FIGS. 2 and 3.

Figure 2A:
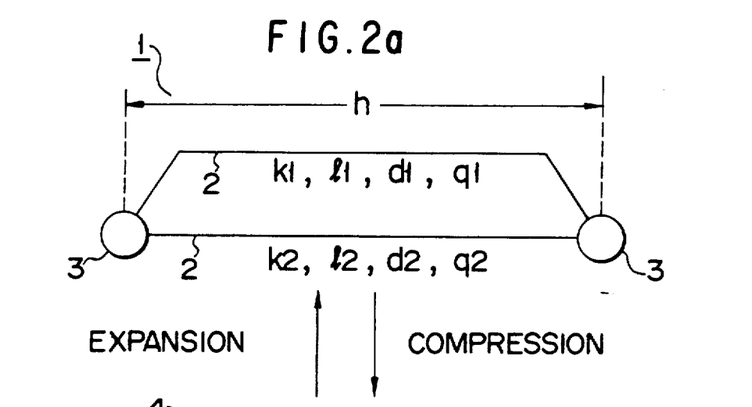
FIGS. 2A and 2B illustrate compression and expansion process wherein two pipelines between two nodes are exemplified.
Figure 2B:
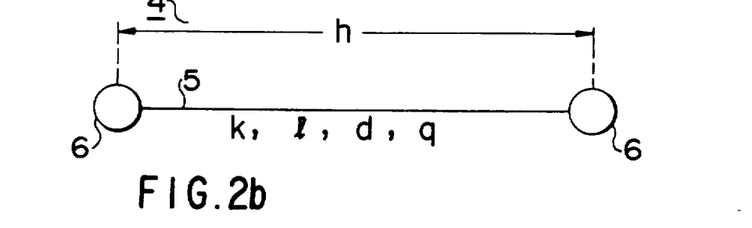
Figure 3A:
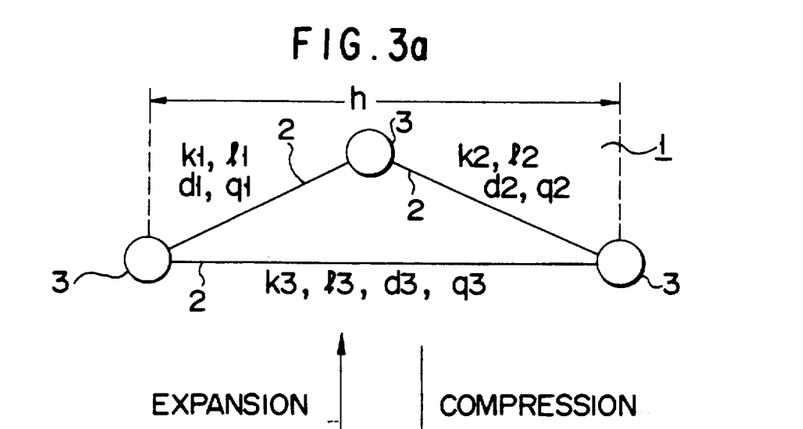
FIGS. 3A and 3B illustrate another compression and expansion process wherein three pipelines among three nodes are exemplified.
Figure 3B:
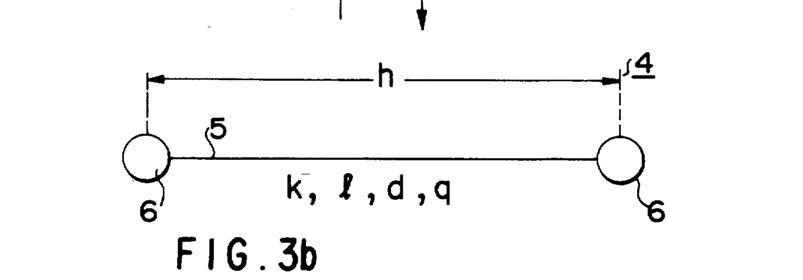

In general, "compression" is to convert (pipeline-synthesize) two pipelines 2 whose ends are connected at a pair of nodes 3 shown in FIG. 2 or three pipelines 2 connected at three nodes 3 shown in FIG. 3 into one pipeline 5 present between a pair of nodes 6.

A compression/expansion sequence between two pipelines 2 and one pipeline 5 shown in FIG. 2 will be described below. As shown in FIG. 2, resistance coefficients of pipelines 2 of piping network chart 1 having two pipelines 2 before synthesis (compression) are represented by k1 and k2, their pipeline lengths are represented by l1 and l2 and their pipeline diameters are represented by d1 and d2. Assume that flow rates q1 and q2 in pipelines 2 when head difference h is generated between nodes 3 are obtained.

If it is assumed that the same head difference h as in the case of two pipelines between nodes 6 is obtained even after the piping network chart is compressed to piping network model 4 expressed by one pipeline 5, the resistance coefficient, the pipeline length, the pipeline diameter, and the flow rate of pipeline 5 are respectively represented by k, l, d, and q. In this case, these values satisfy equations (1).

$$h = klq^\alpha = k1l1q^{\alpha 1} \qquad (1)$$
$$= k2l2q^{\alpha 2}$$
$$q = q1 + q2$$

(where $\alpha$, $\alpha 1$, and $\alpha 2$ are constants)

By modifying equations (1), equation (2) can be obtained:

$$h = kl(q1 + q2)^\alpha \qquad (2)$$
$$= kl\left[\left(\frac{h}{k1l1}\right)^{1/\alpha} + \left(\frac{h}{k2l2}\right)^{1/\alpha}\right]^\alpha$$

When h is eliminated from equation (2), the following equation can be obtained:

$$\frac{1}{kl} = \left[\left(\frac{1}{k1l1}\right)^{1/\alpha} + \left(\frac{1}{k2l2}\right)^{1/\alpha}\right]^\alpha \qquad (2A)$$

The following Hazen-Williams experimental formulas are substituted in equation (2A).

$$k = 10.666C^{-1.85}d^{-4.87} \qquad (3)$$
$$k1 = 10.666C^{-1.85}d1^{-4.87}$$
$$k2 = 10.666C^{-1.85}d2^{-4.87}$$

(where C is a constant)

As a result, equation (4) can be obtained.

$$d^{4.87} = l\left[\left(\frac{d1^{4.87}}{l1}\right)^{1/\alpha} + \left(\frac{d2^{4.87}}{l2}\right)^{1/\alpha}\right]^\alpha \qquad (4)$$

In Hazen-Williams formulas (3), $\alpha = 1.85$.

Since pipeline lengths l1 and l2 and pipeline diameters d1 and d2 of pipelines 2 in actual piping network chart 1, and constant $\alpha$ in equation (4) are already known, pipeline length l of pipeline 5 of synthesized (compressed) piping network model 4 need only be designated to calculate pipeline diameter d of pipeline 2 after compression from equation (4).

When three pipelines 2 shown in FIG. 3 are synthesized (compressed) to one pipeline 5, if the resistance coefficient, the pipeline length, and the pipeline diameter of third pipeline 2 of piping network chart 1 are respectively represented by k3, l3, d3, and q3, the following equations (5) are established.

$$k = klq^\alpha = (k1l1 + k2l2)q^\alpha \qquad (5)$$
$$= k3l3q^{\alpha 3}$$
$$q = q1 + q3$$
$$\text{for } q1 = q2$$

Therefore, $$h = kl(q1 + q2)^\alpha \qquad (6)$$
$$= kl\left[\left(\frac{h}{k1l1 + k2l2}\right)^{1/\alpha} + \left(\frac{1}{k3l3}\right)^{1/\alpha}\right]^\alpha$$

h is eliminated from equation (6) to obtain the following equation:

$$\frac{1}{kl} = \left[\left(\frac{1}{k1l1 + k2l2}\right)^{1/\alpha} + \left(\frac{1}{k3l3}\right)^{1/\alpha}\right]^\alpha \qquad (7)$$

Formulas (3) are substituted in equation (7) to obtain the following equation:

$$d^{4.87} = \left[\left(\frac{1}{l1d1^{-4.87} + l2d2^{-4.87}}\right)^{1/\alpha} + \left(\frac{d3^{4.87}}{l3}\right)^{1/\alpha}\right]^\alpha \qquad (8)$$

Since pipeline diameters d1, d2, and d3, pipeline lengths l1, l2, and l3, and $\alpha(=1.85)$ in equation (8) are already known, pipeline length l of pipeline 5 of synthesized (compressed) piping network model 4 need only be designated to calculate pipeline diameter d from equation (8).

A sequence for returning (expanding) piping network model 4 compressed in the above-mentioned basic sequence to original piping network chart 1 will be described below.

When one pipeline 5 shown in FIG. 2 is expanded to two pipelines 2, equation (9) is used.

$$h = klq^{\alpha} = kl1q^{\alpha} = k2l2q^{\alpha 2} \tag{9}$$

Equation (9) is expanded by substituting Hazen-Williams formulas (3) therein, thus obtaining equation (10):

$$\left(\frac{l}{d^{4.87}}\right)^{1/\alpha} q = \left(\frac{l1}{d1^{4.87}}\right)^{1/\alpha} q1 = \left(\frac{l2}{d2^{4.87}}\right)^{1/\alpha} q2 \tag{10}$$

Therefore, $$q1 = \left(\frac{ld1^{4.87}}{l1 d^{4.87}}\right)^{1/\alpha} q \tag{11}$$

$$q2 = \left(\frac{ld2^{4.87}}{l2 d^{4.87}}\right)^{1/\alpha} q$$

Since flow rate q, pipeline length, and pipeline diameter d of piping network model 4, pipeline lengths l1 and l2 and pipeline diameters d1 and d2 of actual piping network chart 1, and α are known, flow rates q1 and q2 in pipelines 2 of actual piping network chart 1 are calculated from equations (11).

When piping network model 4 including one pipeline 5 is returned (expanded) to piping network chart 1 having three pipelines 2 shown in FIG. 3, the relationship of equation (12) is utilized:

$$h = klq^{\alpha} = (k1l1 + k2l2)q^{\alpha 1} = k3l3q^{\alpha 3} \tag{12}$$
$$\text{for } q1 = q2$$

Therefore, $$\left(\frac{l}{d^{4.87}}\right)^{1/\alpha} q = \left(\frac{l1}{d1^{4.87}} + \frac{l2}{d2^{4.87}}\right)^{1/\alpha} q1 \tag{13}$$
$$= \left(\frac{l3}{d3^{4.87}}\right)^{1/\alpha} q3$$

As a result, $$\left.\begin{array}{l} q1 = q2 \\ = \left(\dfrac{d1^{4.87} d2^{4.87}}{(d2^{4.87} l1 + d1^{4.87} l2) d^{4.87}}\right)^{1/\alpha} q \\ q3 = \left(\dfrac{d3^{4.87}}{l3 d^{4.87}}\right)^{1/\alpha} q \end{array}\right\} \tag{14}$$

In the same manner as described above, since flow rate q, pipeline length l, and pipeline diameter d of pipeline 5 of piping network model 4, pipeline lengths l1, l2, and l3 and pipeline diameters d1, d2, and d3 of pipelines 2 of actual piping network chart 1, and α are known, flow rates q1, q2, and q3 in pipelines 2 of actual piping network chart 1 are calculated from equations (14).

With this method, in order to expand piping network model 4 to actual piping network chart 1, the following data are required:

(i) pipeline lengths l1, l2, and l3 and pipeline diameters d1, d2, and d3 of pipelines 2 before compression, pipeline length l, and pipeline diameter d, and flow rate q of pipeline 5 in piping network model 4 after compression;

(ii) information indicating whether two pipelines are compressed to one pipeline or three pipelines are compressed to one pipeline; and (iii) pipeline Nos. for specifying pipelines 2 before compression, pipeline No. for specifying pipeline 5 after compression, and the like. These data are stored in compression sequence memory 19 shown in FIG. 1.

According to the computerized analyzing system for a piping network with the above arrangement, when image scanner 13 reads actual piping network chart 1, data of chart 1 are stored in initial image data memory 16 through computerized mapping system 11, and are compressed to piping network model 4 by compressor 14 in accordance with the above-mentioned compression sequence. Piping network analyzer 20 analyzes compressed piping network model 4, and the results of analyzation, e.g., flow rate q of pipeline 5, head difference h between nodes, and the like are obtained.

The obtained results of analyzation are expanded to flow rates q1, q2, ..., of pipelines 2, and head difference h between nodes 3 in actual piping network chart 1 by expander 23.

Figure 4D:
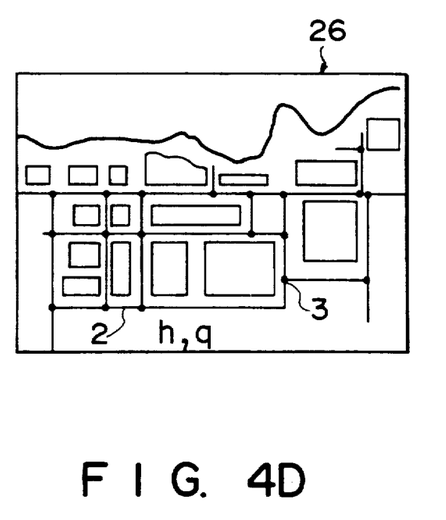

As shown in FIG. 4D, CRT display 14 displays piping network chart 26 in which map 12 and the results of analyzation such as flow rates q and head differences h are superimposed near pipelines 2 and nodes 3.

Therefore, for a system operator who observes the display screen of CRT display 14, since the results of analyzation, e.g., flow rates q and head differences h are displayed in correspondence with pipelines 2 and nodes 3 on actual piping network chart 1, utility of the results of analyzation can be greatly improved as compared to those based on only piping network model 4, and the results of analyzation can be immediately used in maintenance and design modifications of an actual piping network.

As compared to a case wherein piping network analyzation is executed using actual piping network chart 1, a calculation time can be greatly shortened. Note that piping network model 4 and corresponding results of analyzation can also be displayed on CRT display 14.

Figure 6:
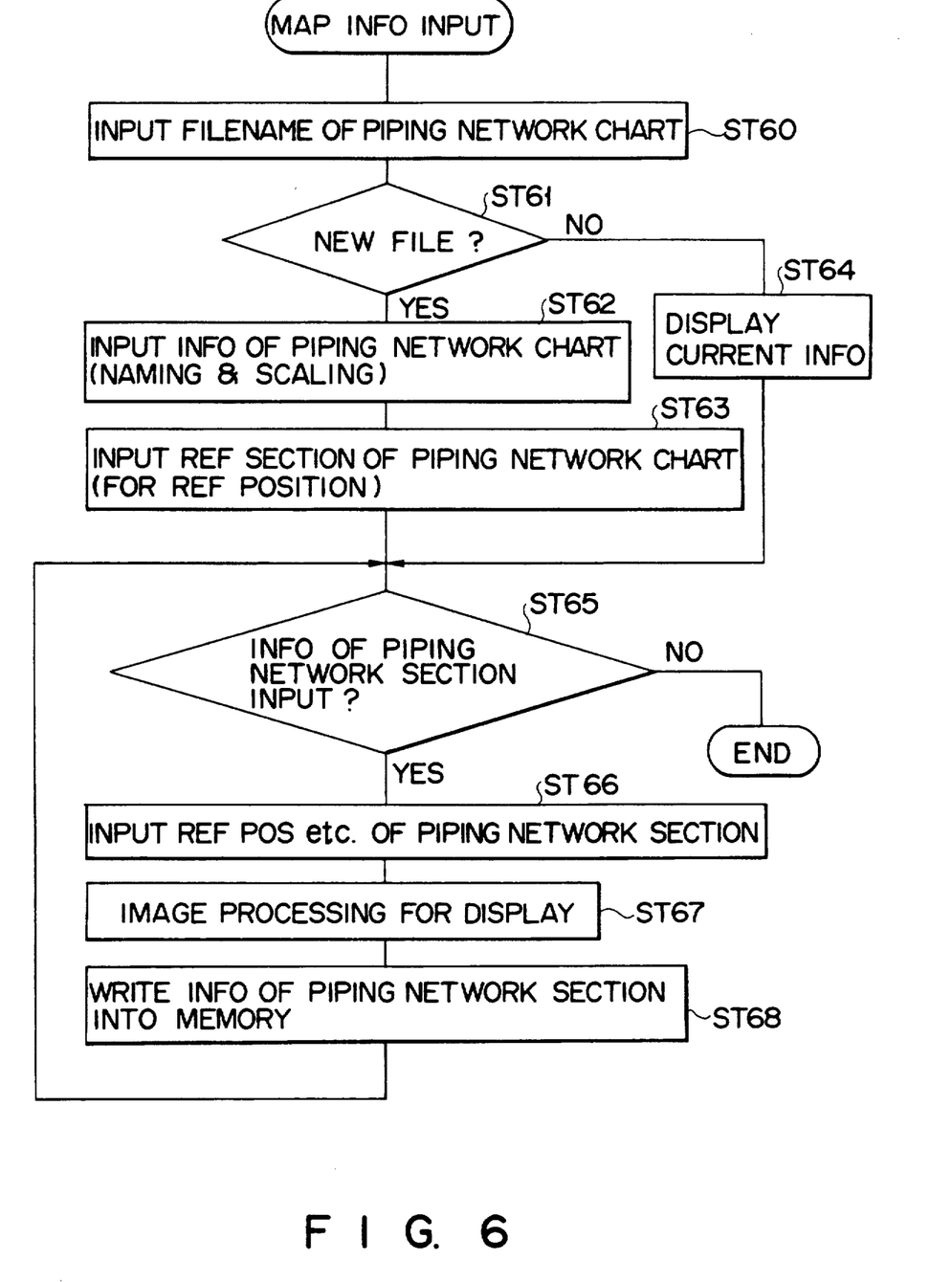
FIG. 6 is a flowchart explaining an input process of map information.

FIG. 6 shows a sequence for inputting map information in the system shown in FIG. 1. A filename of a piping network chart corresponding to map information to be input is input from a keyboard (ST60). If the input filename designates a new file (YES in step ST61), information of a corresponding piping network chart (naming, scaling, and the like) is input (ST62). A reference section of the piping network chart is input as a reference position (ST63).

If the input filename does not designate a new file (NO in step ST61), current information is displayed (ST64). If information of a piping network section is input (YES in step ST65), information such as a reference position and the like of the piping network section is input (ST66). Thereafter, correction processing such as that for a display angle of the input map information is executed, and map information and the like are displayed on CRT display 14 (ST67). Thereafter, piping network section information is written in memory 16 (ST68). If no information of the piping network section is input (NO in step ST65), the processing shown in FIG. 6 is ended.

Figure 7:
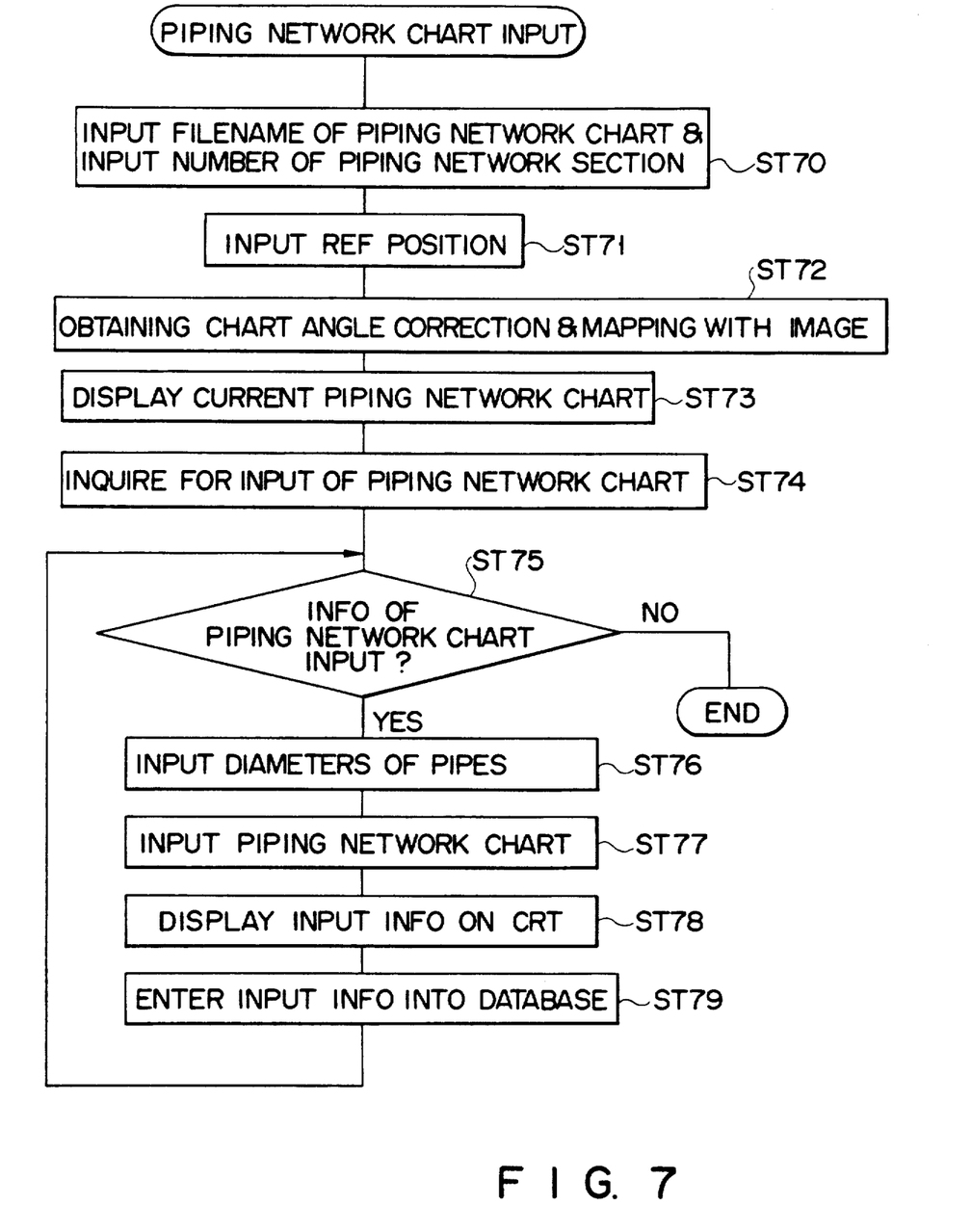
FIG. 7 is a flowchart explaining an input process of information of a piping network chart.

FIG. 7 shows a sequence for inputting piping network chart information in the system shown in FIG. 1. A filename of a piping network chart and the number of a piping network section are input from a keyboard (ST70), and a reference position of the piping network section is input using a mouse or a tablet (ST71). A chart display correction angle is obtained to correct the chart and the corrected chart is then mapped with a displayed image (ST72). Thereafter, the current piping network chart is displayed on CRT display 14 (ST73).

The system inquires an operator whether or not another piping network chart is input (ST74). If another piping network chart is input (YES in step ST75), the diameters of pipelines are input (ST76), and piping network chart information are then input (ST77). The input information is displayed on CRT display 14 (ST78), and is registered in a data base in, e.g., hard disk drive 11A (ST79). If no piping network chart is input (NO in step ST75), the processing shown in FIG. 7 is ended.

Figure 8:
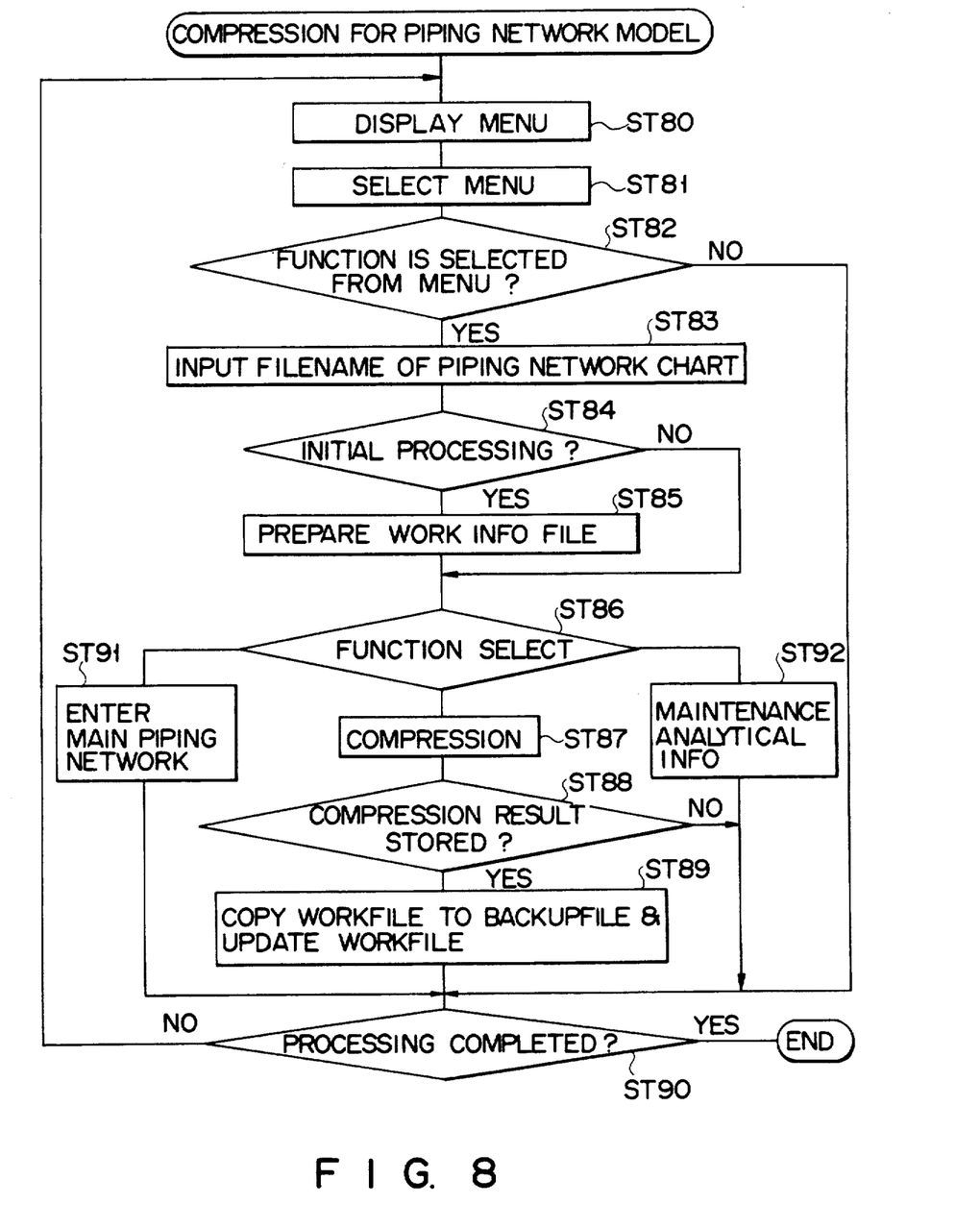
FIG. 8 is a flowchart explaining a compression process for a piping network model.

FIG. 8 shows a sequence for compressing the piping network chart shown in FIG. 4B to the piping network model shown in FIG. 4C. When the program for executing this processing is started, a menu listing processing contents is displayed on CRT display 14 (ST80). An operator can select desired processing (function) from the displayed menu upon operation of a keyboard or mouse (ST81).

After a predetermined function is selected from this menu (YES in step ST82), a filename of the piping network chart is input (ST83). If processing to be executed is initial processing (YES in step ST84), a work information file is prepared first (ST85). If the selected processing is not an initial one (NO in step ST84), since the corresponding work information file is already present, the control advances to the next processing. When no function is selected from the menu (NO in step ST82) to cancel compression processing (YES in step ST90), the processing shown in FIG. 8 is ended.

In the processing shown in FIG. 8, three functions can be selected (ST86). If a compression function to the piping network model is selected, compression is executed (ST88). If a compressed result is to be preserved (YES in step ST88), the work information file is copied to a backup file in, e.g., hard disk drive 11A, and the work information file is then updated (ST89). If an entry function of a main piping network is selected, the corresponding processing is executed (ST91); if a maintenance function of analytical information is selected, the corresponding processing is executed (ST92). If the compression processing in FIG. 8 is to be continued, the control returns to step ST80 (NO in step ST90); if compression processing is completed (YES in step ST90), the processing shown in FIG. 8 is ended.

Figure 9:
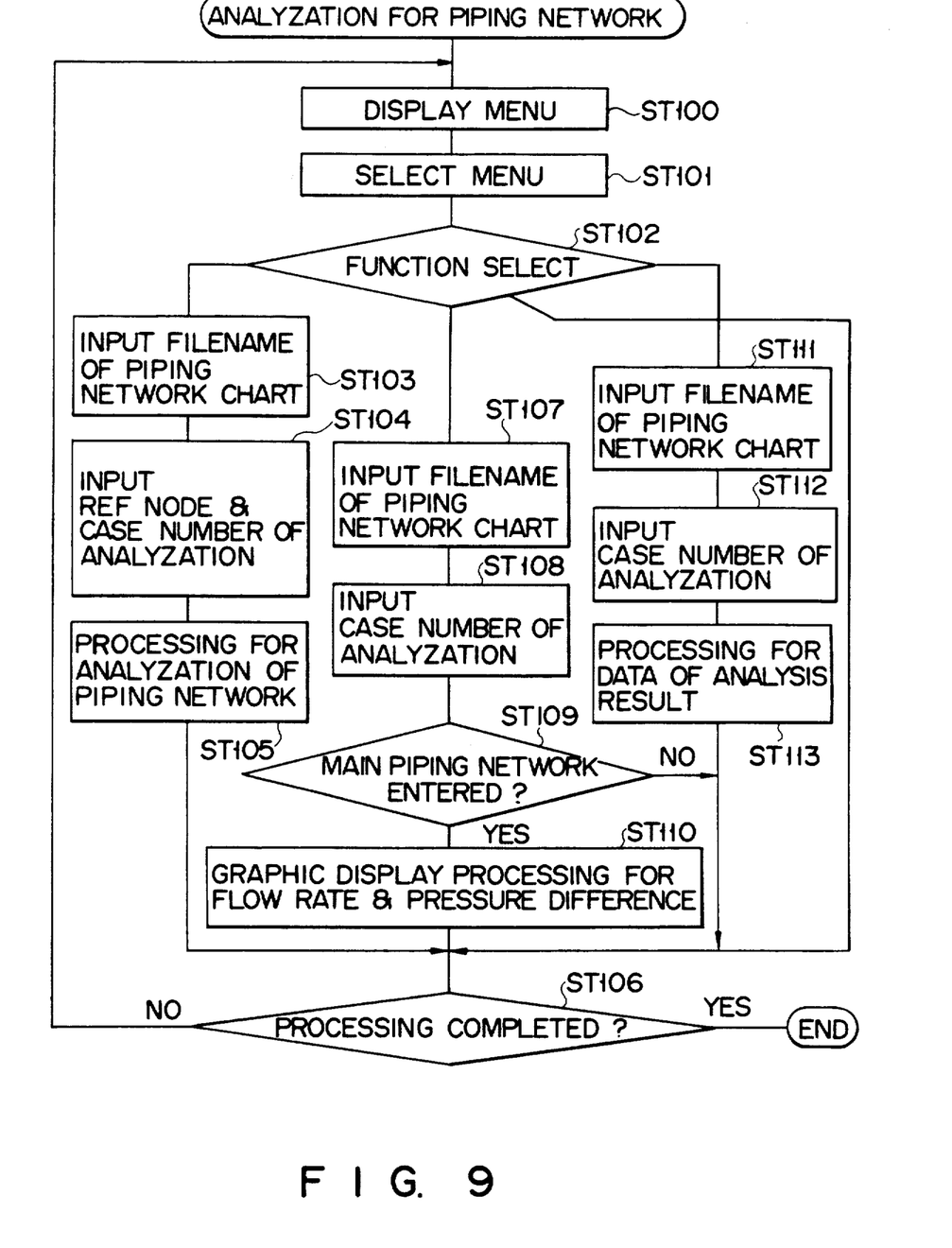
FIG. 9 is a flowchart explaining an analyzation process for a piping network.

FIG. 9 shows a piping analyzation processing sequence. When the program for executing this processing is started, a menu listing processing contents is displayed on CRT display 14 (ST100). An operator selects desired processing (function) from the displayed menu upon operation of a keyboard or mouse (ST101).

In the processing shown in FIG. 9, three functions can be selected (ST102). If a piping network analyzation function is selected, a filename of a piping network chart is input (ST103). After a reference node and a case number of analyzation are input (ST104), analyzation of the piping network is executed (ST105). If the piping network analyzation processing shown in FIG. 9 is to be continued, the control returns to step ST100 (NO in step ST106).

If a graphic display function is selected in step ST102, a filename of a piping network chart is input (ST107), and a case number of analyzation is then input (ST108). If the main piping network has already been entered in the processing of FIG. 8 (YES in step ST109), graphic display processing of data (results of analyzation) such as a flow rate, a pressure difference, and the like is executed (ST110). If piping network analyzation processing is to be continued, the control returns to step ST100 (NO in step ST106).

If a data display function is selected in step ST102, a filename of a piping network chart is input (ST111), and a case number of analyzation is then input (ST112). Thereafter, data display processing of the results of analyzation is executed (ST113). If piping network analyzation processing is to be continued, the control returns to step ST100 (NO in step ST106). If the piping network analyzation processing is completed (YES in step ST106), the processing shown in FIG. 9 is ended.

Figure 10:
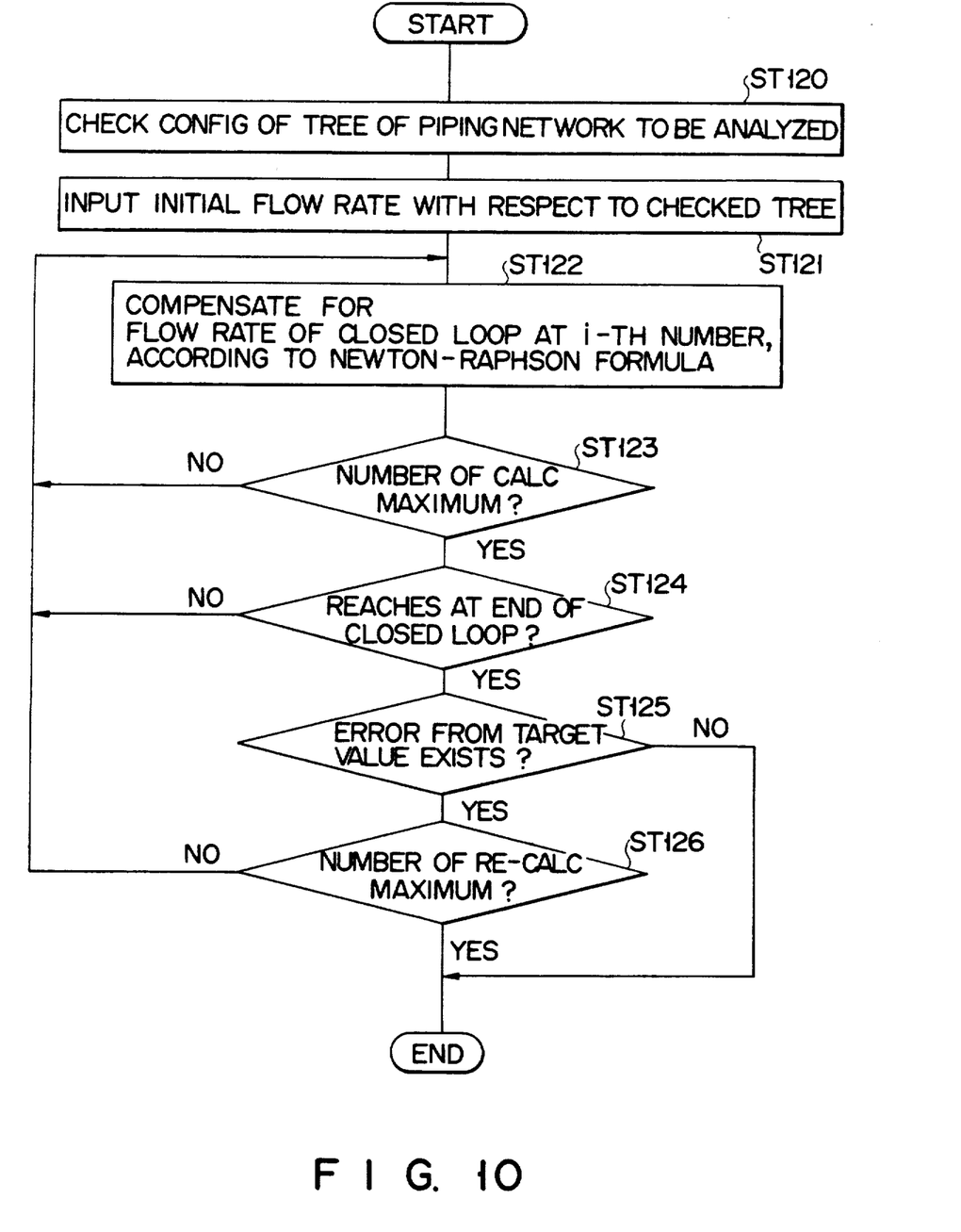
FIG. 10 is a flowchart explaining details of the analyzation explained in FIG. 9.

FIG. 10 shows a processing content of piping network analyzation (step ST105) shown in FIG. 9. A tree configuration of a piping network to be analyzed (the relationship among pipelines 2 and their nodes 3) is checked (ST120). If the tree configuration of the piping network to be analyzed is determined, a system operator inputs an initial flow rate of this tree configuration (ST121). After the initial flow rate is input, the flow rate of a pipeline closed loop of an i-th number is corrected according to the Newton-Raphson formula (ST122).

A calculation according to the Newton-Raphson formula is repeated a number of times corresponding to a maximum value of i for each closed loop (YES in step ST123), and is continued until the closed loop to be calculated ends (YES in step ST124). As a result, if an error in calculation result from a given target value exists (YES in step ST125), a recalculation is performed up to the maximum number of times of i (YES in step ST126), and the processing in FIG. 10 is ended. If no error in calculation result from the given target value exists (NO in step ST125), the processing in FIG. 10 is ended at that time.

Note that analytical calculations can be made even if inputting of an initial flow rate in step ST121 is omitted. In this case, considerable time is required until a calculation result is obtained.

In the calculation processing in FIG. 10, the height of a node; the water level of a distributing reservoir; a pipeline diameter, a pipeline length, a pipeline count, a pump pressure, a negative pressure, and a valve pressure of a pipeline; and the like may be appropriately utilized as auxiliary information.

Figure 11:
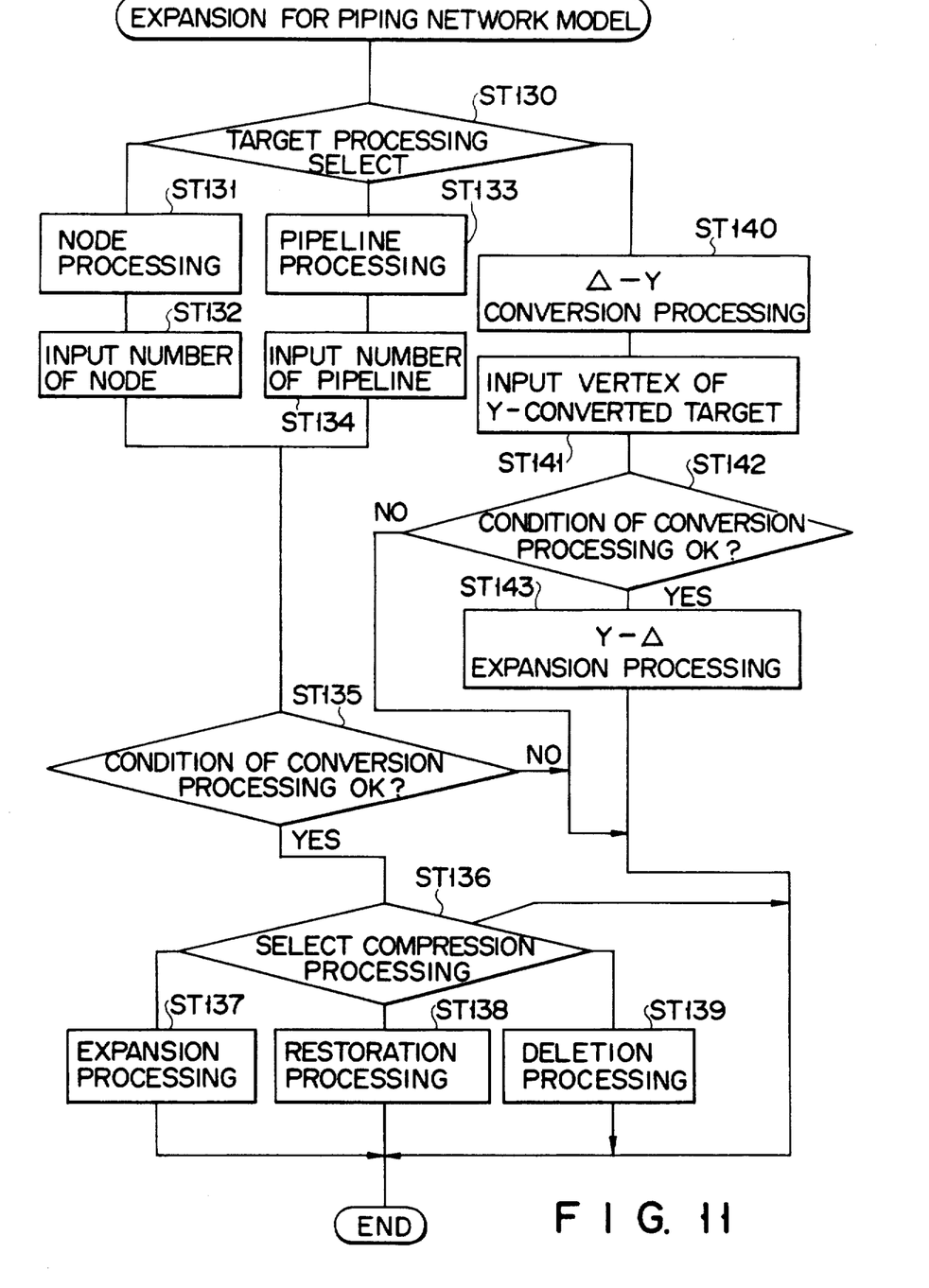
FIG. 11 is a flowchart explaining an expansion process for a piping network.

FIG. 11 shows an expansion sequence of the compressed piping network model. First, a processing target is selected (ST130). When a node is selected as the processing target (ST131), a number of the node is input (ST132). If a pipeline is selected as the processing target (ST133), a number of the pipeline is input (ST134).

After the number of the node or pipeline is input, it is checked if a condition of conversion processing is satisfied (ST135). This checking operation is made based on the fact "whether or not a node or pipeline is one which has been compressed (synthesized)".

If the condition of the conversion processing is satisfied, expansion processing (restoration of a plurality of pipes) (ST137), restoration processing of nodes or pipelines which were deleted upon compression (ST138), or processing for deleting an arbitrarily added node or pipeline by a system operator (ST139) is executed.

If processing for converting a Δ-shaped pipeline (having three nodes at three vertices) into a Y-shaped pipeline (having one node at a merging point of three pipes) is selected in step ST130, a vertex of a Y-converted processing target pipeline is input by a mouse or tablet (ST141) after Δ-Y conversion processing (ST140). Thereafter, it is checked in the same manner as in step ST135 if the condition of conversion processing is satisfied (ST142). If the condition of the conversion processing is satisfied (YES in step ST142), expansion processing for converting the Y-shaped pipe-line into the Δ-shaped pipeline is executed (ST143).

If the conversion condition is not satisfied in step ST135 or ST142 (NO), the processing in FIG. 11 is ended after processing operations of steps ST137 to ST139 and ST143.

Figure 12:
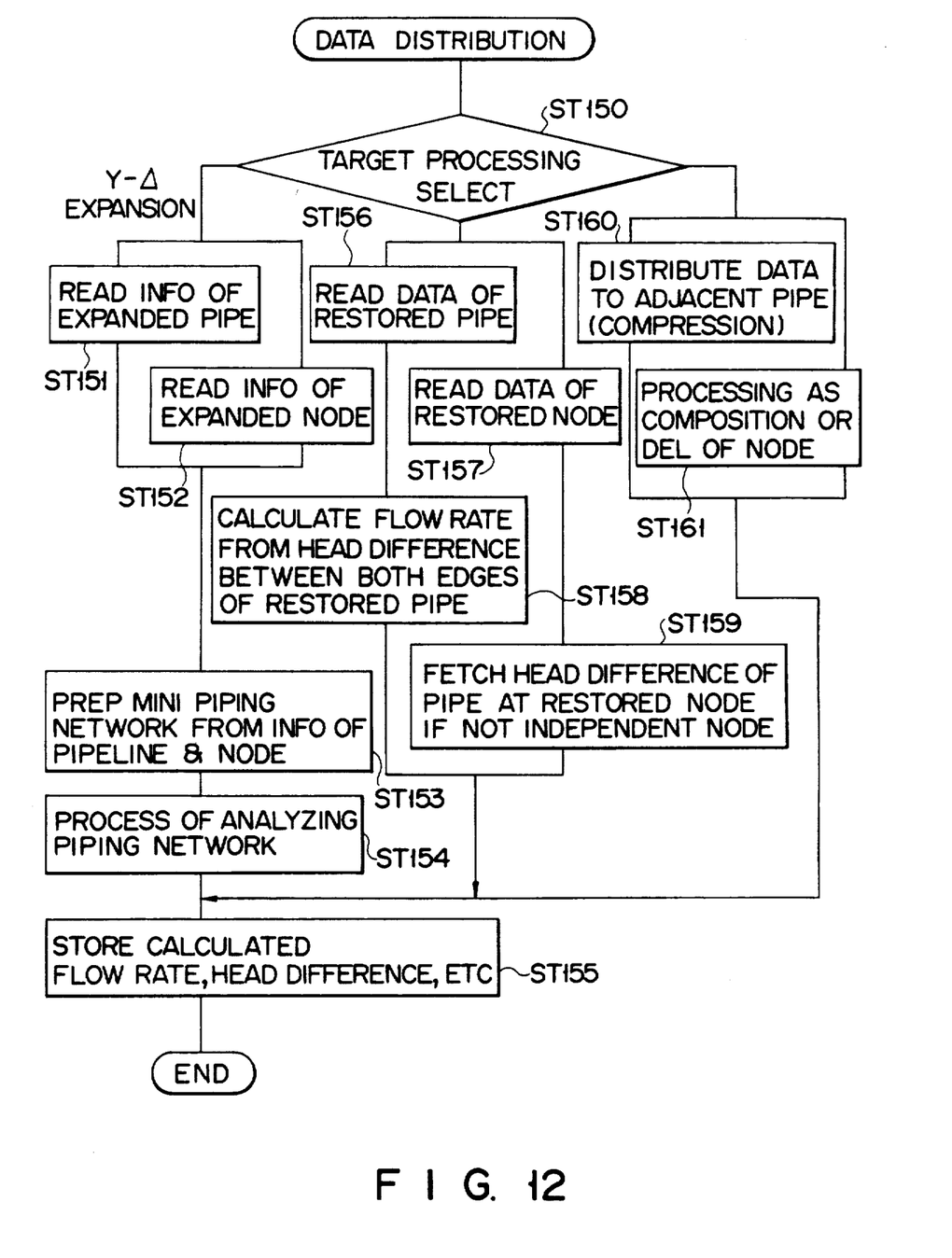
FIG. 12 is a flowchart explaining a distribution process for a piping network.

FIG. 12 shows a data distribution processing sequence executed by data distributor 24 shown in FIG. 1. This data distribution processing is executed when the processing (expansion, restoration, and deletion) in steps ST137 to ST139 in FIG. 11 is executed.

A processing target is selected (ST150). When the Y-Δ conversion processing (expansion processing) is selected, information of an expanded pipeline (pipeline resistance coefficient, pipeline length, pipeline diameter, etc.) and information of an expanded node (head difference, height, etc.) are read (ST151, ST152). A simple mini piping network is prepared based on the read pipeline information and node information (ST153), and piping network analyzation is executed for the mini piping network (ST154).

The calculation results such as a flow rate, a head difference, and the like obtained by the piping network analyzation are stored in, e.g., hard disk drive 11A shown in FIG. 1 (ST155).

If restoration processing is selected in step ST150, data of the restored pipeline is read (ST156), and a flow rate of the pipeline is calculated from a head difference between nodes at both ends of the restored pipeline (ST158). Data of a restored node is read (ST157). If the node is not an independent one, a head difference of a pipeline located at the restored node is fetched (ST159). Thereafter, the calculation results of the piping network analyzation are stored (ST155).

If deletion processing is selected in step ST150, data are distributed to adjacent pipelines (compression processing) (ST160), and similar compression processing is executed together with synthesis and deletion of nodes (ST161). Thereafter, the calculation results of the piping network analyzation are stored (ST155).

As described above, according to the computerized analyzing system for a piping network of the present invention, results of analyzation calculated after a piping network chart is temporarily compressed to a piping network model are expanded to obtain those corresponding to the original piping network chart by executing the compression sequence in an opposite manner. Therefore, the results of analyzation, e.g., flow rates and pressures of pipelines and nodes in an actual piping network chart can be displayed together with the actual piping network chart without increasing time required for analyzation, thus greatly improving precision of analyzation. In addition, the results of analyzation can be immediately recognized, and the system as a whole is very easy to use.

While the invention has been described in connection with what is presently considered to be the mode practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A computerized analyzing system for piping network having pipelines and nodes comprising:
   means for storing a sequence of a predetermined compression process;
   means for compressing a chart representative of the piping network into a piping network model in accordance with said compression process sequence, such that said piping network model is substantially equivalent to said piping network;
   means for analyzing characteristics of said piping network model to provide a result of analyzation;
   means for expanding the analyzation result to specific characteristics of said piping network chart in accordance with a reverse-order execution of said compression process sequence;
   means for storing an image of a map with respect to the piping network; and
   means for adding information of the specific characteristics of said piping network chart to the image of said map to provide a graphical piping network image.

2. A system according to claim 1, wherein said analyzing means includes means for compensating for errors in the analyzation result.

3. A system according to claim 1, further comprising: means for distributing the analyzation result to the respective pipelines and nodes of said piping network.

4. A system according to claim 1, further comprising: means for visually displaying said graphical piping network image.

5. A system according to claim 1, further comprising: means for fetching the image of said map as well as optional information with respect to said map.

6. A system according to claim 1, further comprising: means for inputting specific information with respect to pipelines of said piping network to said image storing means.

7. A system according to claim 1, further comprising: means for outputting a hard copy of said graphical piping network image.

8. A system according to claim 1, further comprising: means for storing information used in the computerized analyzing system.

9. A system according to claim 1, wherein the result of said compression process results in two nodes connected by a single pipe path, and said compression means includes means for converting two-node pipeline paths, selected from said piping network chart, into two-node model of said piping network model.

10. A system according to claim 1, wherein the result of said compression process results in two nodes connected by a single pipe path, and said compressing means includes means for converting three-node pipeline paths, selected from said piping network chart, into a two-node model of said piping network model.

11. A computerized analyzing system for piping network having pipelines and nodes comprising:
   means for storing a sequence of a predetermined compression process;
   means for compressing a chart representative of the piping network into a piping network model in accordance with said compression process sequence, such that said piping network model is substantially equivalent to said piping network;
   means for analyzing characteristics of said piping network model to provide a result of analyzation;
   means for expanding the analyzation result to specific characteristics of said piping network chart in accordance with a reverse-order execution of said compression process sequence;
   means for storing an image of a map with respect to the piping network;
   means for adding information of the specific characteristics of said piping network chart to the image of said map to provide a graphical piping network image;
   means for compensating for errors in the analyzation result; and
   means for distributing the analyzation result to the respective pipelines and nodes of said piping network.

12. A method of computerized analyzing for a piping network, comprising the steps of:
   storing a sequence of a predetermined compression process;
   compressing a chart representative of the piping network into a piping network model in accordance with said compression process, such that said piping network model is substantially equivalent to said piping network;
   analyzing characteristics of said piping network model to provide a result of analyzation;
   expanding the analyzation result to specific characteristics of said piping network chart in accordance with a reverse-order execution of said compression process sequence;
   storing an image of a map with respect to the piping network; and
   adding information of the specific characteristics of said piping network chart to the image of said map to provide a graphical piping network image.

* * * * *